US005445034A

United States Patent [19]

Peter et al.

[11] Patent Number: 5,445,034

[45] Date of Patent: Aug. 29, 1995

[54] METHOD OF MEASURING THE PRESSURE OF A GAS IN A GAS ACCUMULATOR, AND A GAS ACCUMULATOR FOR CARRYING OUT THE METHOD

[75] Inventors: Gunter Peter, Tholey-Theley; Norbert Weber, Sulzbach, both of Germany

[73] Assignee: Hydac Technology GmbH, Sulzbach, Germany

[21] Appl. No.: 119,147

[22] PCT Filed: May 13, 1992

[86] PCT No.: PCT/EP92/01047

§ 371 Date: Sep. 22, 1993

§ 102(e) Date: Sep. 22, 1993

[87] PCT Pub. No.: WO92/21012

PCT Pub. Date: Nov. 26, 1992

[30] Foreign Application Priority Data

May 21, 1991 [DE] Germany ........................ 41 16 482.2

[51] Int. Cl.[6] ............................................ G01F 1/28

[52] U.S. Cl. ................................ 73/861.75; 73/23.21

[58] Field of Search .................... 73/23.21, 64.4, 64.51, 73/861.04, 861.74, 861.75, 863.02, 865.6

[56] References Cited

U.S. PATENT DOCUMENTS 4,346,584 8/1982 Boehringer ...................... 73/861.75
4,527,421 7/1985 Miller, Jr. .......................... 73/64.51
5,195,380 3/1993 Hatton et al. .................... 73/861.04

FOREIGN PATENT DOCUMENTS 2106182 4/1983 United Kingdom .

OTHER PUBLICATIONS

Patent Abstracts of Japan, vol. 13, No. 291 (P-893) (3639) 6 Jul. 1989 & JPA 1073 232 (Nobuyuki Sugimura) 17 Mar. 1989.

Patent Abstracts of Japan, vol. 13, No. 256 (P-884) (3604) 14 Jun. 1989 & JP A 1054 325 (Nobuyuki Sugimura) 1 Mar. 1989.

Translation of JP Appl No. 62-230497, published Mar. 14, 1989.

*Primary Examiner*—Richard E. Chilcot, Jr.
*Assistant Examiner*—William L. Oen
*Attorney, Agent, or Firm*—Roylance, Abrams, Berdo & Goodman

[57] ABSTRACT

Pressure of a gas in a gas accumulator coupled to a fluid circuit is measured in a system involving separating gas from pressure fluid in a gas accumulator by a separating element, measuring pressure of the pressure fluid with a pressure detector coupled to the gas accumulator when the separating element is in a preadjustable position having a gas pressure assignable to it, detecting the preadjustable position by a monitor coupled to the pressure detector, and initiating measurement of the fluid pressure upon detection of the separating element in the preadjustable position.

14 Claims, 1 Drawing Sheet

METHOD OF MEASURING THE PRESSURE OF A GAS IN A GAS ACCUMULATOR, AND A GAS ACCUMULATOR FOR CARRYING OUT THE METHOD

FIELD OF THE INVENTION

The present invention relates to a system for measuring the pressure of a gas in a gas accumulator. The gas accumulator can be attached to a fluid circuit. In the gas accumulator, the gas is separated from the fluid by a separating element.

BACKGROUND OF THE INVENTION

Gas accumulators, such as floating piston accumulators, diaphragm accumulators and bubble accumulators, have a preadjustable pressure set point before their attachment to the fluid circuit on the gas side. This point is also termed the initial gas pressure of the accumulator.

Such accumulators now need to control the initial gas pressure required for the operation as authorized, at certain time intervals, since certain gas losses are to be calculated dependent upon the method of operation of the accumulator. Until this time, for this purpose, the fluid circuit and the attached accumulator are conventionally made pressureless. At least the part of the assembly relating to the accumulator is made pressureless to check the pressure set point and/or the initial gas pressure of the gas found in the accumulator in this pressureless state, and if necessary, to replenish it. The gas is mostly in the form of nitrogen gas. A filling and checking device is mounted on the gas side of the accumulator for carrying out this known method. The actual pressure level prevailing on the gas side is measured by means of a manometer. If this actual pressure falls below the level of the initial gas pressure, the accumulator is filled by means of the filling device. This filling process is monitored by the manometer. The resulting processing method is time-consuming. Alternatively, the accumulator, together with the component part of the fluid circuit, is then not ready for work.

In a method of this sort for measurement of the pressure of a gas in a gas accumulator according to JP-A-1-73232, a pressure measurement curve is formed over a time period. Initially, in the time period the liquid pressure rises very sharply in a straight line, and then changes over, with increasing measuring time, into a smoothly rising curve. At the point of changing over from the linear to the curved pressure measurement pattern, the gas pressure in the bubble accumulator corresponds precisely to the fluid pressure measured at this point. To shorten the measuring time in the known method, it is suggested to undertake a measurement only in the time interval or within that "window" in which according to the process the aforementioned break in the measurement curve is expected. A comparable method is disclosed by JP-A-1-54325, whereby the relevant measurement is performed by means of a cyclical measuring device at predetermined uniform time intervals.

By this automatic or manual detection method for the measurement of gas, occurrences of gas losses can be determined for the hydropneumatic accumulator. However, upon detection of gas pressure outside the preadjusted measured value range in the form of the "window", this known method of measurement cannot determine whether actual gas losses have occurred and/or whether an accumulator defect is present and/or whether the measuring device does not work reliably. To overcome this drawback inherent in the known method, it is possible basically to carry out a complete measuring cycle (longer than 20 seconds) and finally to evaluate the measured curve. Generally speaking, a computer is then absolutely required. A rapid disconnection, for instance within safety/security ranges, such as in nuclear power plants or the like, of the fluid circuit associated to the relevant gas accumulator is then however no longer guaranteed whatsoever.

SUMMARY OF THE INVENTION

Objects of the present invention are to provide a method, as well as a gas accumulator to carry out this method, which allow a checking of the initial gas pressure without negatively influencing the readiness of operation of the associated fluid circuit and which allow for precise and rapid detection of the measured values even when the relevant gas accumulator is out of commission as a result of material breakdown from the gas side.

The foregoing objects are basically obtained by a method of measuring pressure of a gas in a gas accumulator coupled to a fluid circuit. The method comprises the steps of separating gas from pressure fluid in a gas accumulator by a separating means, measuring pressure of the pressure fluid with a pressure detector means coupled to said gas accumulator when the separating means is in a preadjustable position having a gas pressure assignable thereto, detecting the preadjustable position by a monitoring means coupled to the pressure detector means, and initiating measurement of the fluid pressure upon detection of the separating means in the preadjustable position.

The foregoing objects are also basically attained by a gas accumulator attachable to a fluid circuit, comprising a housing with a separating means, movably mounted in the housing, for separating a gas side from a fluid pressure side in the housing. A pressure detector means is coupled to the housing for measuring pressure of pressure fluid in the fluid pressure side of said housing. Monitoring means is coupled to said pressure detector means for detecting a preadjustable position of the separating means and for initiating measurement of fluid pressure by the pressure detector means when said separating means is in the preadjustable position.

In the case of a preadjustable position of the separating element, the gas pressure assignable in this position is measured by the pressure detector. The detection of this preadjustable position is determined by a monitoring device, which initiates the detection of the measurement by the pressure detector. The preadjustable position of the separating element, which can be a floating piston, a diaphragm or a bubble, is selected such that the gas pressure assignable thereto is known, ascertained for instance by experimental measurements. This assignable gas pressure can be measured by the pressure detector arranged on the fluid side and can be set in relation to the desired gas pressure set point and/or the initial gas pressure. If this actual pressure falls below the level of the initial gas pressure, the gas accumulator can be refilled by a filling device. With the method of operation according to the present invention, continuous monitoring of the accumulator is possible, and the readiness for operation of the fluid circuit is not negatively influenced.

As opposed to the known method, the separating element of the present invention is monitored relative to its position. This also picks up, in the sort of a "timed" measured value detection at predetermined time points, pressures outside the expected range of initial gas pressures inherent in the gas accumulator. Thus, erroneous interpretations and assumptions that the measuring device does not work reliably are for the most part avoided. This is also valid when the gas accumulator is unusable from the gas-side because of a material breakdown. As a result of the possible "timed" or "cyclical" detection of the measured value of the initial gas pressure level, it is possible to disconnect immediately in the security or safety range of the fluid circuit, without, as with the method known until this time, requiring plotting of the costly measuring curves.

The gas accumulator according to the present invention facilitates performing the method according to the present invention. The measured level detection and, if necessary, the replenishing of the gas accumulator can be automated.

Other objects, advantages and salient features of the present invention will become apparent from the following detailed description, which, taken in conjunction with the annexed drawings, discloses a preferred embodiment of the present invention.

BRIEF DESCRIPTION OF THE DRAWING

The sole drawing FIGURE, which forms a part of this disclosure, is a side elevational view in section illustrating the bottom part of a bubble accumulator according to the present invention, in which the left half of the drawing shows the accumulator in one of its operating positions and the right half of the drawing shows the accumulator in the measuring position.

DETAILED DESCRIPTION OF THE INVENTION

Figure 1:
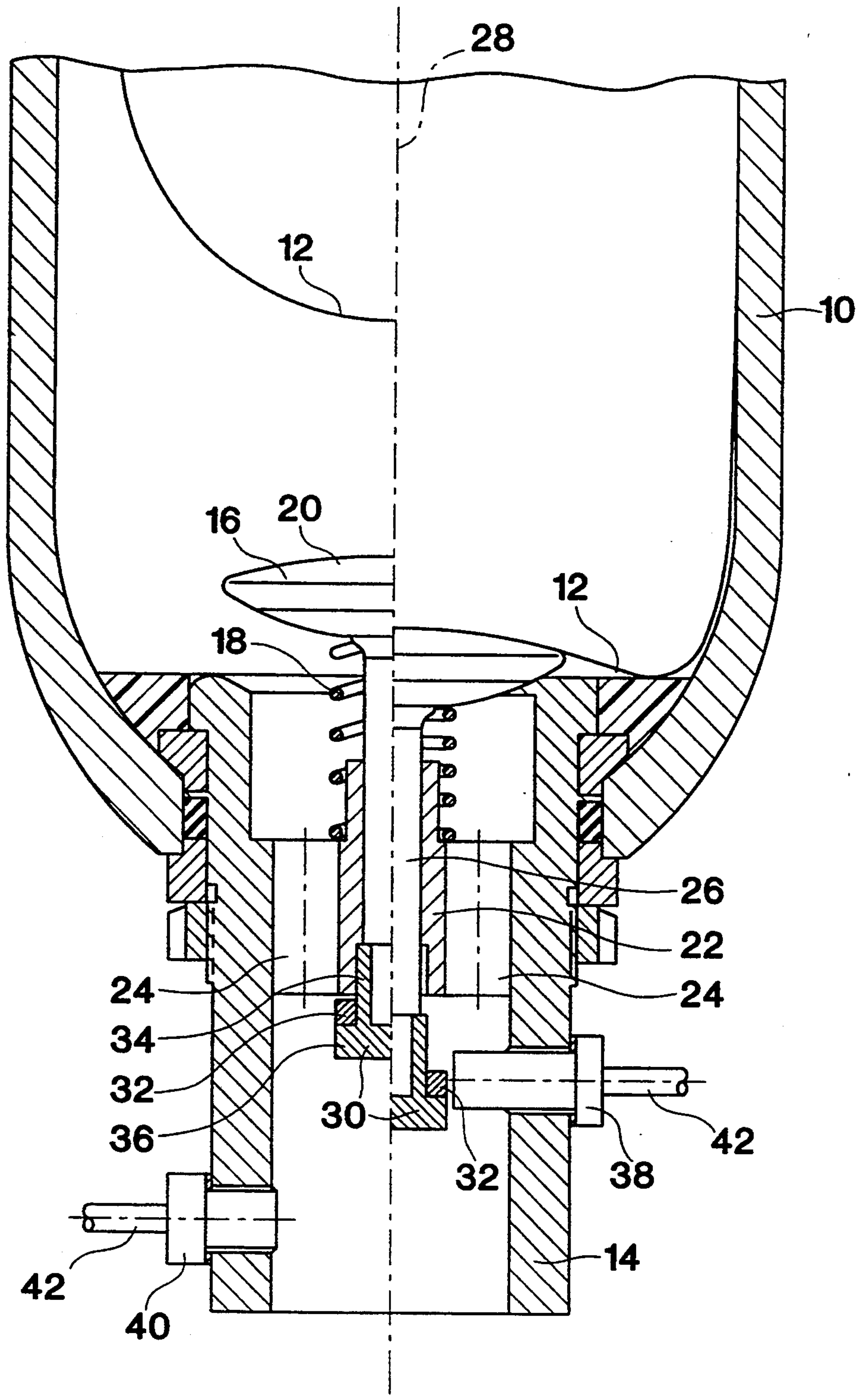

A gas accumulator in the form of a bubble accumulator, according to the drawing, has a steel container forming housing 10.

Nitrogen gas and compressed liquid, in the form of hydraulic oil, are separated in housing 10 from one another by a closed, flexibly configured bubble 12. The gas is enclosed inside bubble 12. In the present invention, the bubble represents the separating element in the gas accumulator. At its bottom end, as viewed in the drawing, housing 10 has an attachment part 14. Attachment part 14 is of traditional configuration, and thus, need not be described in detail. The bubble accumulator can be attached through the attachment part to a fluid circuit (not shown), which circuit can be open or closed.

Attachment part 14 essentially forms a hollow cylinder. Poppet valve 16 is guided into the attachment part, and is formed of nonmagnetic material. A force potential member, in the form of a compression spring 18, is supported at one end of the bottom part of plate 20 of poppet valve 16, and at its other end on a hollow sleeve 22. The sleeve is arranged in the middle of attachment part 14 as a component part of the attachment part. The connecting part (not shown) connecting hollow sleeve 22 with attachment part 14 has at least two longitudinal boreholes 24 passing through it. The boreholes provide a possible connection of the fluid side of the bubble accumulator with the not shown fluid circuit.

The valve stem 26 of popper valve 16 is guided to move longitudinally in hollow sleeve 22 along the longitudinal axis 28 of the bubble accumulator and is connected at one end with plate 20. The other valve stem end has a sleeve-like, nonmagnetic connecting device support 30. A permanent magnet in the shape of a ring, which is impact- and pressure-free, is mounted on support 30 and serves as connecting device 32. Connecting device support 30 has flange-like projection 34 engaged in a recess of hollow sleeve 22 when the valve setting of poppet valve 16 of connecting device support 30 is sufficiently widely opened. Hollow sleeve 22 and projection 34 form a stop for poppet valve 16 in its completely open setting. Permanent magnet 32 is arranged on the flange pedestal 36 in this setting, as shown in the left half of the drawing. The permanent magnet is axially spaced from the bottom of hollow sleeve 22 and does not come into contact with the sleeve.

Connecting device 32 is part of a monitoring arrangement to monitor the position of poppet valve 16. Device 32 cooperates with another part of the monitoring arrangement in the form of a sensor 38. Sensor 38 can be screwed into attachment part 14, and comprises a housing formed of nonmagnetic material. Sensor 38 is a Reed or Hall sensor, formed of a switch which can be operated by magnet 32 or can utilize the Hall effect. Such sensors are generally commercially available, and therefore, are not described in detail.

By configuring the monitoring device in this manner, a contact-free, and thus leakage-free detection, of the positions both of poppet value 16 and of bubble 12 can be obtained. Connecting device 32 can also be constructed in the form of a cam cooperating with a not shown stationary operating switch of the same sort. Also sensor 38 need not be arranged to the side relative to the direction of movement of poppet valve 16 on attachment part 14 as shown in the drawing, but instead can lie in the direction of movement of poppet valve 16, i.e., in the direction of longitudinal axis 28, beneath connecting device support 30, as viewed in the drawing. Care is to be taken that, even with completely closed poppet valve 16, as seen from the direction of longitudinal axis 28, an axial distance remains between the poppet valve and the sensor arranged in such a manner. It is expedient then that the connecting device should be arranged, as seen in the drawing, beneath the connecting device support and connected tightly with said support, for example, by means of a holding screw.

In addition to and beneath sensor 38 another commercially available and conventional pressure detector 40 is threaded in attachment part 14. Pressure detector 40 establishes the fluid pressure prevailing fluid-side in attachment part 14. Sensor 38 and pressure detector 40 both have corresponding electric attachments 42 for connection to a computer (not shown). The computer controls sensor 38 and pressure detector 40 for a measuring process and evaluates the measurements.

The method according to the present invention is explained in greater detail relative to the device described above. Before delivery of the bubble accumulator to the customer, and thus, before attachment of the same to the fluid circuit, through a gas valve (not shown), arranged on the end of housing 10 opposite poppet valve 16, bubble accumulator 12 is filled with gas of a preadjustable pressure set point. That pressure is then indicated as the initial gas pressure of the bubble accumulator. Bubble accumulator 12, initially pressurized with gas, then fills the steel container 10 entirely and closes poppet valve 16. In that condition, plate 20 opposes the biasing force of compression spring 18 and provides a sealed arrangement with the top end of attachment part 14 as seen in the right hand side of the drawing. Poppet valve 16 consequently prevents emergence of bubble accumulator 12 from the inside of housing 10 and protects it from damage.

If the bubble accumulator is attached to the fluid circuit or to the hydraulic system, and the pressure of the fluid attains or exceeds the value of the preadjustable initial gas pressure, then the valve opens. The valve opening is represented in the left half of the drawing. The fluid flows into the accumulator and compresses the nitrogen in bubble accumulator 12. The gas volume in bubble 12 thus decreases as a result of the incoming liquid volume.

With removal of liquid from the accumulator, accumulator bubble 12 becomes larger again and for instance, may take the position illustrated in the right hand side of the drawing. In this setting, poppet valve 16 is nearly closed and accumulator bubble 12 takes substantially the position it had inherently when it was originally filled with gas to the pressure level set point or the initial gas pressure, in which popper valve 16 is in a closed setting.

Connecting device 32 and sensor 38 are arranged relative to one another so that pressure detector 40 can detect the pressure level of the gas directly before the closed setting of poppet valve 16 has been reached, as that pressure prevails fluid-side in attachment part 14. In this measuring setting, i.e., directly before the impact of valve plate 20 on its seat, connecting device 32 actuates sensor 38. Sensor 38 by,means of the computer (not shown), actuates pressure detector 40 to perform a measurement. In the case of this measurement, the fluid-side system pressure has dropped considerably, because otherwise poppet valve 16 cannot close. The actual level of the gas pressure prevailing in bubble accumulator 12 can be detected directly through pressure detector 40, since system pressure and gas pressure are coupled with one another without leakage at least shortly before closing poppet valve 16.

The actual gas pressure prevailing within bubble accumulator 12 is the measuring setting, as is shown in the right half of the drawing, even during operation without gas leakage, as may be the case at the beginning, will be slightly greater than with completely tightly closed poppet valve 16. That setting is assigned to the intrinsic gas pressure set point, but cannot be used on account of the breaking of the fluid connection between the inside of housing 10 and attachment part 14 for a measurement. This slight differential between the pressure set point with closed valve 16 and the "fictive" pressure set point shortly before closing valve 16 however can be compensated by the computer. From compensation measurements, the computer recognizes the assignable gas pressure set point for bubble accumulator 12 in the measuring setting. In case the pressure drops slightly below this "fictive" pressure set point, the computer allows for an automatic replenishing process.

From the foregoing, even in a different preadjustable position of the separating element, this different position can be clearly assigned a "fictive" pressure set point. Such "fictive" pressure set point can be converted to the originally prevailing initial gas pressure and can initiate a replenishing process, if necessary, after detection of the actual gas pressure by pressure detector 40. Preferably, however, to avoid measuring errors, the pressure measurement by pressure detector 40 is always carried out at the same setting of the poppet valve and the same setting of the bubble accumulator 12 along with it. Thus, the most precise measuring results are attainable shortly before the closing engagement of poppet valve plate 20 on attachment part 14. Operating in this manner, a pressure increase can also be determined and corrected with reference to the theoretical pressure.

The temperature prevailing in the measurement could be detected by means of a temperature sensor (not shown). The temperature sensor can be arranged adjacent to pressure detector 40 in attachment part 14. Thus, the computer would be in a position to calculate the pressure prevailing at this temperature at those pressure levels which are measured for the original filling of the bubble accumulator producing the initial gas pressure with the temperature prevalent in that particular case. Errors in measurement based on temperature deviations can then be excluded.

The connecting device mounted on the poppet valve could also be mounted directly on the separating member, for instance, on or in the piston of a floating piston accumulator. The connecting device then could cooperate with a sensor which is mounted outside the accumulator housing.

Using the method according to the present invention, a complete gas loss in the bubble can also be detected, as can occur if there is a tear in the skin of the bubble, because the poppet valve then no longer closes. The monitoring device detects that the poppet valve no longer closes.

While a particular embodiment has been chosen to illustrate the invention, it will understood by those skilled in the art that various changes and modifications can be made therein without departing from the scope of the invention as defined in the appended claims.

We claim:

1. A method of measuring pressure of a gas in a gas accumulator, coupled to a fluid circuit, for storing and supplying fluid pressure for the fluid circuit, comprising the steps of:

separating gas from pressure fluid inside a gas accumulator housing by a separating means movably mounted in the housing, the housing having attachment means coupled to a fluid pressure side of the housing and conveying fluid pressure in said housing to a fluid circuit;

measuring pressure of the pressure fluid with a pressure detector means coupled to said gas accumulator when the separating means is in a preadjustable position having a gas pressure assignable thereto;

detecting the preadjustable position by a monitoring means coupled to the pressure detector means; and initiating measurement of the fluid pressure upon detection of the separating means in the preadjustable position.

2. A gas accumulator, comprising:

a housing with a separating means, movably mounted inside said housing, for separating a gas side from a fluid pressure side inside said housing;

attachment means, coupled to said fluid pressure side of said housing, for conveying fluid pressure stored in said housing to a fluid circuit;

a pressure detector means, coupled to said housing, for measuring pressure of pressure fluid in said fluid pressure side of said housing;

monitoring means, coupled to said pressure detector means, for detecting a pre-adjustable position of said separating means and for initiating measurement of fluid pressure by said pressure detector means when said separating means is in said preadjustable position.

3. A gas accumulator according to claim 2 wherein the gas accumulator is a bubble accumulator;

a poppet valve forms a first part of said monitoring means and is mounted in said attachment means; and said pressure detector means is mounted in said attachment means.

4. A gas accumulator according to claim 3 wherein said first part of said monitoring means comprises a connecting device; and a second part of said monitoring means comprises a sensor mounted on said attachment means, said sensor cooperating with said connecting device.

5. A gas accumulator according to claim 4 wherein said connecting device comprises a magnet; and said sensor comprise a switch operated by said magnet.

6. A gas accumulator according to claim 4 wherein said connecting device comprises a magnet; and said sensor comprise a Hall effect operable switch.

7. A gas accumulator according to claim 5 wherein said sensor is disposed laterally relative to axial movement of said poppet valve.

8. A gas accumulator according to claim 4 wherein said sensor is disposed laterally relative to axial movement of said poppet valve.

9. A gas accumulator according to claim 7 wherein said connecting device and said sensor are arranged relative to one another such that said pressure detecting means measures the pressure directly before said poppet valve reaches a closed position.

10. A gas accumulator according to claim 4 wherein said connecting device and said sensor are arranged relative to one another such that said pressure detecting means measures the pressure directly before said poppet valve reaches a closed position.

11. A gas accumulator according to claim 2 wherein a temperature sensor is arranged adjacent to said pressure detector means.

12. A gas accumulator according to claim 2 wherein said gas side and said fluid pressure side abut opposite sides of said separating means.

13. A gas accumulator according to claim 2 wherein said fluid pressure side is filled with hydraulic liquid; and said separating means comprise a gas-liquid interface.

14. A method according to claim 1 wherein said pressure fluid is a hydraulic liquid; and said separating means is a gas-liquid interface.

* * * * *